J. C. Mills,
Potato Planter.
No. 112,617. Patented Mar. 14, 1871.

Witnesses,
J. E. Hutchinson
C. L. Evert.

Inventor.
John C. Mills.
per
Alexander T. Mason
Attys.

United States Patent Office.

JOHN C. MILLS, OF ROCHESTER, NEW YORK, ASSIGNOR TO HIMSELF AND RICHARD LEAKE, OF SAME PLACE.

Letters Patent No. 112,617, dated March 14, 1871.

IMPROVEMENT IN POTATO-PLANTERS.

The Schedule referred to in these Letters Patent and making part of the same.

*To all whom it may concern:*

Be it known that I, JOHN C. MILLS, of Rochester, in the county of Monroe and in the State of New York, have invented certain new and useful Improvements in Potato-Planter; and I do hereby declare that the following is a full, clear, and exact description thereof, reference being had to the accompanying drawing and to the letters of reference marked thereon making a part of this specification.

The nature of my invention consists in the construction and arrangement of a "potato-planter," as will be hereinafter fully set forth.

In order to enable others skilled in the art to which my invention appertains to make and use the same, I will now proceed to describe its construction and operation, referring to the annexed drawing, in which—

Figure 1:
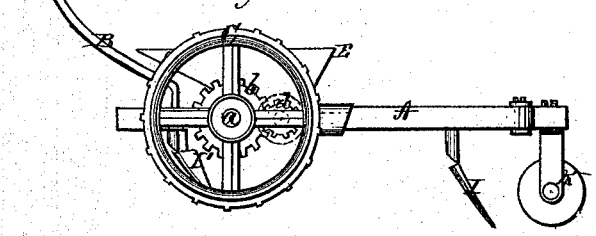

Figure 1 is a side elevation, and

Figure 2:
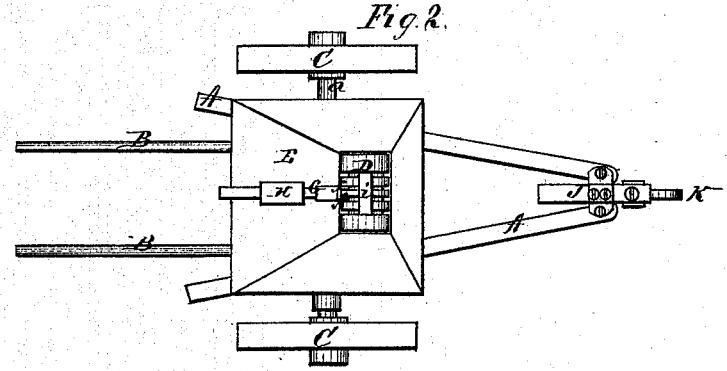

Figure 2 a plan view of my machine.

Figure 3:
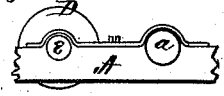

Figure 3 is an enlarged side view of a portion of the frame.

A represents the frame of my machine, made in V-shape, with a cross-bar near the ends, from which the handles B B extend upward and toward the rear, as shown in fig. 1.

The frame A is supported upon the wheels C C, mounted on the axle $a$, which axle carries a spur or cog-wheel, $b$.

This cog-wheel gears with a pinion, $d$, on the end of a shaft, $e$, which has its bearings on the frame A, and is provided with a roller, D.

This roller, which works in the bottom of the hopper E, is provided with grooves $i\ i$, as shown in fig. 1, to take in one or more potatoes, as the case may require, and force them against the knives $f\ f$, cutting them in two or more pieces and dropping them at equal distances apart.

The knives $f\ f$ are attached to a slide, G, which moves in a clip, H, on the inner rear side of the hopper E.

The furrow to receive the potatoes is opened by the shovel I attached to a bar, J, which passes through the front end of the frame A, and has at its forward end the gauge-wheel K.

The potatoes, after being deposited in the furrow, are covered by two shovels, I' I', attached to the cross-bar in the rear part of the frame.

When it is desired to plant potatoes without cutting, the slide G is drawn back so as to lift the knives out of the slots or grooves.

Having thus fully described my invention,

What I claim as new, and desire to secure by Letters Patent, is—

1. The roller D, provided with grooves $i$, and operating substantially as and for the purposes herein set forth.

2. The arrangement, on the inside of the hopper E, of the clip H, slide G, and knives $f\ f$, substantially as shown and described.

3. The combination of the V-shaped frame A, handles B B, axle $a$, wheels C C, roller D, hopper E, slide G, with knives $f\ f$, shovels I I, and gauge-wheel K, all constructed and arranged substantially as and for the purposes herein set forth.

In testimony that I claim the foregoing I have hereunto set my hand and seal this 10th day of December, 1870.

JOHN C. MILLS. [L. S.]

Witnesses:
 C. L. EVERT,
 CHRIS. GAFFIN.